United States Patent
Mine et al.

(10) Patent No.: US 8,499,112 B2
(45) Date of Patent: Jul. 30, 2013

(54) STORAGE CONTROL APPARATUS

(75) Inventors: Hiroshi Mine, Yokohama (JP); Ken Nomura, Yokohama (JP); Damien Le Moal, Machida (JP); Tadashi Takeuchi, Tokyo (JP); Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 44 days.

(21) Appl. No.: 13/203,830

(22) PCT Filed: Aug. 16, 2011

(86) PCT No.: PCT/JP2011/004600
§ 371 (c)(1),
(2), (4) Date: Aug. 29, 2011

(87) PCT Pub. No.: WO2013/024510
PCT Pub. Date: Feb. 21, 2013

(65) Prior Publication Data
US 2013/0046911 A1    Feb. 21, 2013

(51) Int. Cl.
*G06F 13/24*    (2006.01)
(52) U.S. Cl.
USPC ............................. 710/267; 718/1; 710/200
(58) Field of Classification Search
USPC ......... 710/260–269, 240–244, 200, 305–306; 718/1
See application file for complete search history.

(56) References Cited

U.S. PATENT DOCUMENTS

| | | | |
|---|---|---|---|
| 5,805,790 A * | 9/1998 | Nota et al. | ................. 714/10 |
| 2004/0117532 A1 | 6/2004 | Bennett et al. | |
| 2010/0138208 A1 | 6/2010 | Hattori et al. | |
| 2010/0169883 A1 * | 7/2010 | Bogin et al. | ................. 718/1 |
| 2011/0179418 A1 | 7/2011 | Takebe et al. | |

FOREIGN PATENT DOCUMENTS

JP    2010157232 A    7/2010

OTHER PUBLICATIONS

Motike et al., "Virtio network paravirtualization driver: Implementation and performance of a de-facto standard", Computer Standards and Interfaces, Elsevier Sequoia, Lausanne, CH, vol. 34, No. 1, pp. 36-47, May 3, 2011.

Heeseung et al., "Transparent Fault Tolerance of Device Drivers for Virtual Machines", IEEE Transactions on Computers, IEEE Service Center, Los Alamitos, CA, US, vol. 59, No. 11, pp. 1466-1479, Nov. 1, 2010.

* cited by examiner

*Primary Examiner* — Tim T Vo
*Assistant Examiner* — Kim Huynh
(74) *Attorney, Agent, or Firm* — Volpe And Koenig, P.C.

(57) ABSTRACT

An aspect of the invention is a storage control apparatus, comprising a plurality of processors, a memory, an I/O device coupled to a storage device, a virtualization module that allocates a first processor to a first guest and a second processor to a second guest from among the plurality of processors, and an interrupt control module that receives an interrupt from the I/O device and transmits the interrupt to any one of the plurality of processors, wherein the virtualization module comprises, a state detection module that detects at least one of a state of the first guest and a state of the first processor, and an interrupt delivery destination control module that switches the interrupt with respect to the first processor to the second processor when at least one of the state of the first guest and the state of the first processor becomes a predetermined state.

13 Claims, 10 Drawing Sheets

| OS | OS1 | OSj | OSk | ... | OSm | |
|---|---|---|---|---|---|---|
| INTERRUPT TYPE | PASS-THROUGH | PASS-THROUGH | EMULATION | | EMULATION | 901 |
| SERVICE TYPE | I/O-DEDICATED | I/O-DEDICATED | GENERAL-PURPOSE | | GENERAL-PURPOSE | 902 |
| ALLOWABLE CPU LOAD | 70 | 80 | 70 | | 100 | 903 |
| COUPLED DEVICE COUNT | 2 | 1 | 1 | | 1 | 904 |

GUEST OS INFORMATION MANAGEMENT TABLE 900

Fig. 10

| DEVICE | OCCUPIED DEVICE | SHARED DEVICE | ... | OCCUPIED DEVICE p | SHARED DEVICE q |
|---|---|---|---|---|---|
| DEVICE TYPE | HBA | NIC | | HBA | NIC |
| VIRTUALIZATION TYPE | PHYSICAL | PHYSICAL | | VIRTUAL | VIRTUAL |
| MAXIMUM VIRTUALIZATION COUNT | 64 | 100 | | 0 | 0 |
| INTERRUPT DELIVERY DESTINATION | CPU1 | CPU1, CPUi | | | |

DEVICE INFORMATION MANAGEMENT TABLE — 1000

STORAGE CONTROL APPARATUS

TECHNICAL FIELD

This invention relates to a technology for controlling a destination of an interrupt transmitted from an I/O device in an environment of a virtualized computer.

BACKGROUND ART

In order to reduce costs of operating and managing computers, a virtualization technology for aggregating a plurality of computers into one physical computer is making further progress as the number of cores of a multi-core processor increases.

Virtualized software is control software that divides computer resources such as a CPU (processor) and an I/O device of one physical computer and allocates the divided computer resources to a plurality of virtual machines that are virtual computers. One OS (guest OS) can run on each of the virtual machines. Studies of using the virtualization technology also for a control apparatus for storage devices are being conducted in order to provide high functionalities and improve availability.

With regard to the processor that executes the virtualized software, one that has a virtualization assist feature such as a Virtualization Technology for Xeon (VT-x) feature with INTEL Architecture (iA)-32 or the like is in the mainstream. The VT-x is a feature that assigns different operation privileges to the virtualized software and the guest OS, and is implemented as hardware of the processor.

With regard to the I/O device, there are known occupied allocation in which the virtual machine occupies a physical I/O device, shared allocation in which a plurality of virtual machines share the physical I/O device, and the like. Single Root I/O Virtualization (SR-IOV) defined by PCI eXpress or the like is known as a technology that enables the shared allocation.

In order to share one I/O device among the plurality of virtual machines, an interrupt signal transmitted from the I/O device needs to be distributed to the respective virtual machines. As a technology for distributing the interrupt signal transmitted from one I/O device to a plurality of processors, for example, Japanese Patent Application Laid-open No. 2010-157232 A (PTL 1) is known. Japanese Patent Application Laid-open No. 2010-157232 A discloses a technology for transmitting an interrupt signal received from a physical device controller to a predetermined, virtual machine by redirecting the interrupt signal to a plurality of virtual device controllers.

It should be noted that a message signaled interrupt (MSI) defined by PCI and PCI eXpress or the like is used as a hardware I/O interrupt transmitted from an I/O device.

CITATION LIST

Patent Literature

PTL 1: JP 2010-157232 A

SUMMARY OF INVENTION

Technical Problem

However, according to the above-mentioned conventional example, if a fault occurs in a virtual machine or a processor, an interrupt signal can be transmitted to the virtual machine of a transmission destination, while an interrupt processing is not completed, and hence the virtual machine or the processor cannot return a completion notification of the interrupt processing to the I/O device.

As a result, the I/O device stops while waiting for the completion notification of the interrupt processing, and cannot be utilized by another virtual machine. This leads to a fear that services of all the virtual machines that share the I/O device may stop. In particular, in a case where a plurality of virtual machines share a host bus adapter (HBA) that accesses a storage device as an I/O device, there is a problem that if a fault occurs in any one of the virtual machines and processors, the other normal virtual machines cannot access the storage device.

Further, in a virtualized environment in which a large number of virtual machines are executed on a physical computer, each time a change is made to a configuration of the virtual machine or the I/O device, settings of the transmission destination of the interrupt signal need to be changed. This raises a problem that it takes enormous amounts of time and labor for an administrator or the like of a computer system to set the transmission destination of the interrupt signal for each of the large number of virtual machines.

Therefore, this invention has been made in view of the above-mentioned problems, and an object thereof is to continue services of other virtual machines even if a fault occurs in a virtual machine or a processor that shares an I/O device therewith. Another object thereof is to allow settings of a transmission destination of an interrupt signal to be easily made in a virtual computer system provided with a large number of virtual machines.

Solution to Problem

An aspect of the invention is a storage control apparatus, comprising a plurality of processors, a memory, an I/O device coupled to a storage device, a virtualization module that allocates a first processor to a first guest and a second processor to a second guest from among the plurality of processors, and an interrupt control module that receives an interrupt from the I/O device and transmits the interrupt to any one of the plurality of processors, wherein the virtualization module comprises, a state detection module that detects at least one of a state of the first guest and a state of the first processor, and an interrupt delivery destination control module that switches the interrupt with respect to the first processor to the second processor when the state detection module detects at least one of the state of the first guest and the state of the first processor becomes a predetermined state.

Advantageous Effects of Invention

According to this invention, the services of other virtual machines that use the I/O device can be continued without waiting for a recovery from a fault even if the fault occurs in the virtual machine or the processor that shares the I/O device therewith. Further, the settings of the transmission destination of the interrupt signal can be easily made in the virtual computer system provided with a large number of virtual machines.

DESCRIPTION OF EMBODIMENTS

Hereinafter, embodiments of this invention are described with reference to the accompanying drawings.

First Embodiment

Figure 1:
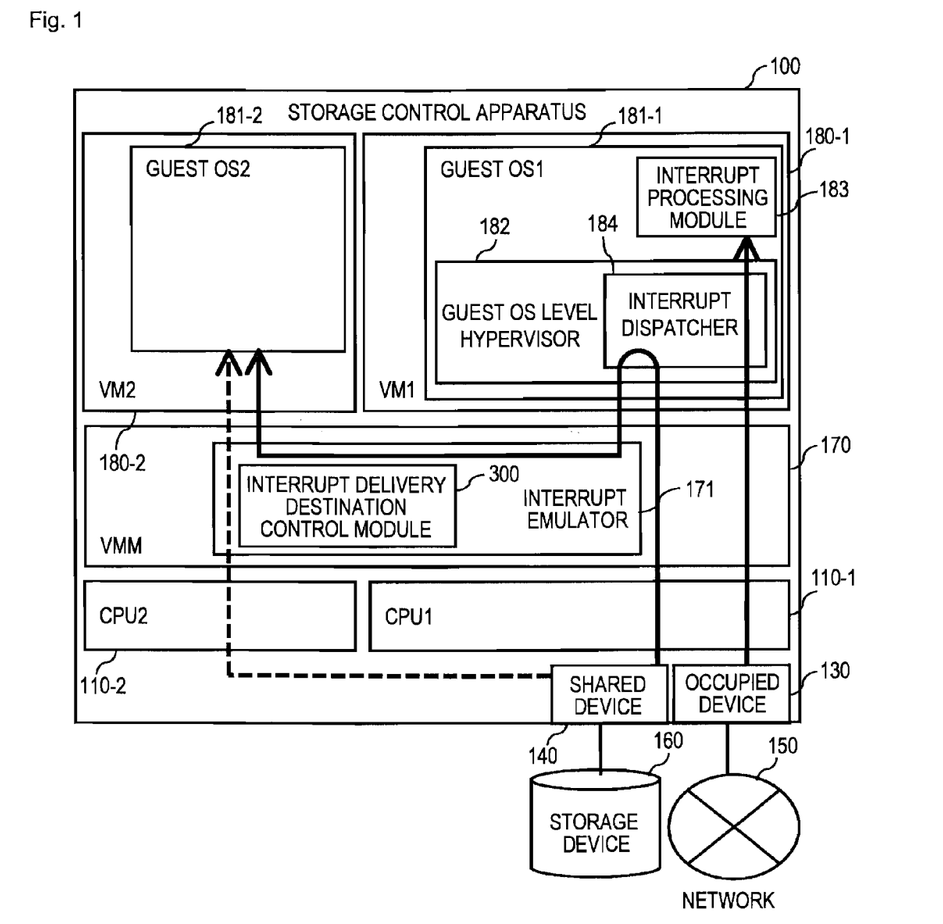
FIG. 1 shows a first embodiment of this invention, and is a block diagram showing a storage control apparatus.

FIG. 1 is a block diagram illustrating an example of functional elements of a storage control device according to a first embodiment of this invention.

A storage control apparatus 100 includes two CPUs of a CPU1 (110-1) and a CPU2 (110-2), an occupied device 130, and a shared device 140. The storage control apparatus 100 is coupled to a network 150 via the occupied device 130. The storage control apparatus 100 is coupled to a storage device 160 via the shared device 140.

The storage control apparatus 100 provides, for example, data accumulation and distribution services such as a file server and a web server that receive and write data from the network 150 and to the storage device 160 and read and transmit data from the storage device 160 and to the network 150.

The occupied device 130 is configured by, for example, an I/O device such as a network interface card (MC). The shared device 140 is configured by, for example, an I/O device such as a host bus adapter (HBA) that performs communications with the storage device 160. It should be noted that each of the occupied device 130 and the shared device 140 may be a device that can be virtually shared as a plurality of devices in conformity with SR-IOV or the like.

The network 150 is configured by, for example, a local area network (LAN) or a wide area network (WAN). The storage device 160 may be configured by, for example, a hard disk drive (HDD), a solid state drive (SSD), or a RAID system coupled through a storage area network (SAN).

Hardware (described later) of the storage control apparatus 100 is virtualized by a virtual machine monitor (VMM) 170, and provides a plurality of virtual machines (VMs). The storage control apparatus 100 can execute mutually different operating systems (OS) within the plurality of VMs provided by the virtual machine monitor (VMM) 170.

In this embodiment, a guest OS1 (181-1) runs on a virtual machine 1 (VM1) 180-1, and a guest OS2 (181-2) runs on a virtual machine 2 (VM2) 180-2. The VM1 (180-1) is executed on the CPU1 (110-1), and the VM2 (180-2) is executed on the CPU2 (110-2).

Here, the CPU1 (1104) and the CPU2 (110-2) are provided with, for example, the VT-x that is a virtualization assist mechanism of Intel, and the VMM 170 uses the VT-x to virtualize devices of the storage control apparatus 100. The VMM 170 includes an interrupt emulator 171 that emulates a hardware I/O interrupt with respect to the VM2 (180-2). The interrupt emulator 171 includes an interrupt delivery destination control module 300 that selects a transmission destination of the hardware I/O interrupt.

The guest OS1 (181-1) includes a guest OS level hypervisor 182 and an interrupt processing module 183. The guest OS1 (181-1) is, for example, a real-time OS that is specialized in I/O processing and dedicated to data accumulation and distribution, and accesses the storage device 160 by the iSCSI or Fibre-Channel over Ether (FCoE) protocol to provide a service involved in storage such as a block storage service.

The guest OS level hypervisor 182 includes an interrupt dispatcher 184 that distributes the received hardware I/O interrupt to a predetermined transmission destination. It should be noted that the guest OS level hypervisor 182 may, for example, further operate another guest OS on the guest OS1 (181-1).

The interrupt processing module 183 of the guest OS1 (181-1) is, for example, an interrupt handler routine for device drivers of the shared device 140, the occupied device 130, and the like, and performs a processing corresponding to the hardware I/O interrupt.

The guest OS2 (181-2) is, for example, a general-purpose OS such as Linux or Windows, and provides a file storage service by the Network File System (NFS) or Common Internet File System (CIFS) protocol.

The interrupt delivery destination control module 300 of the interrupt emulator 171 controls delivery destinations of the hardware I/O interrupt and an emulated I/O interrupt. The interrupt delivery destination control module 300 normally controls the hardware I/O interrupts generated by the occupied device 130 and the shared device 140 so as to be delivered to the CPU1 (110-1) that executes the VM1 (180-1). At this time, the hardware I/O interrupt is directly delivered (passed through) to the guest OS1 (181-1) within the VM1 (180-1) without the intermediation of the VMM 170. Therefore, an execution mode of the CPU1 (110-1) may be kept in a guest OS mode (VMX non-root of VT-x) for executing the VM1 (180-1). Therefore, for example, there is no need to switch the mode of the Intel VT-x from the VMX non-root mode for executing the guest OS1 (181-1) to a VMX root mode for executing the VMM 170. This can suppress overhead required to switch the VMX mode.

Each of the hardware I/O interrupts generated by the occupied device 130 and the shared device 140 is, for example, a message signaled interrupt (MSI) as described above in the conventional example.

The guest OS1 (181-1) receives the hardware I/O interrupt by the interrupt dispatcher 184 within the guest OS level hypervisor 182 that is executed in the guest OS mode.

When the hardware I/O interrupt is received, the interrupt dispatcher 184 determines whether or not the received interrupt is to be processed by the guest OS1 (181-1) according to the I/O device of an interrupt generation source or the kind of interrupt.

If the hardware I/O interrupt is to be processed by the guest OS1 (181-1), the interrupt dispatcher 184 forwards the hardware I/O interrupt to the guest OS1 (181-1), and the interrupt processing module 183 performs a predetermined interrupt processing. When the interrupt processing is completed, the interrupt processing module 183 returns a notification of an interrupt completion to the I/O device.

Examples of the interrupt processed by the interrupt processing module 183 of the guest OS1 (181-1) include the hardware I/O interrupt generated by the occupied device 130 occupied by the guest OS1 (181-1) and an interrupt corresponding to an I/O request issued by the guest OS1 (181-1) among the hardware I/O interrupts generated by the shared device 140 shared by the guest OS1 (181-1) and the guest OS2 (181-2).

If the interrupt is not to be processed by the guest OS1 (181-1), the interrupt dispatcher 184 transfers control to the interrupt emulator 171 of the VMM 170. At this time, the switching of the execution mode may occur in the CPU1 (110-1). The execution mode in this case is switched from the above-mentioned VMX non-root mode to the VMX root mode.

Examples of the interrupt that is not processed by the guest OS1 (181-1) include an interrupt corresponding to the I/O request issued by the guest OS2 (181-2) among the interrupts generated by the shared device 140.

If a processing of the hardware I/O interrupt is transferred from the interrupt dispatcher 184, the interrupt emulator 171 decides the delivery destination of the interrupt by the interrupt delivery destination control module 300.

In a case where the interrupt destination is the guest OS2 (181-2), the interrupt delivery destination control module 300 emulates the hardware I/O interrupt by issuing, for example, an inter-processor interrupt (IPI) to the CPU2 (110-2) that executes the VM2 (180-2) having the guest OS2 (181-2). The guest OS2 (181-2) may process the interrupt (IPI) emulated by the interrupt emulator 171 using an existing virtualization technology as the hardware I/O interrupt. It should be noted that the guest OS2 (181-2) includes the same interrupt processing module (not shown) as the interrupt processing module 183 of the guest OS1 (181-1), and processes the interrupt with respect to the CPU2 (110-2).

If an abnormality is detected in the guest OS1 (181-1), the interrupt delivery destination control module 300 changes settings of an interrupt controller 210 so that the interrupt destination of the shared device 140 is switched to the CPU2 (110-2). Accordingly, even if a fault occurs in the guest OS of an interrupt pass-through destination, the hardware I/O interrupt of the shared device 140 can be delivered to another guest OS that runs within a different VM. This allows the shared device 140 to continue its operation.

As described above, the guest OS1 (181-1) can process the hardware I/O interrupt from the occupied device 130 and the shared device 140 without overhead of the VMM 170. In addition, even if a fault occurs in the guest OS1 (181-1), the guest OS2 (181-2) can receive the I/O interrupt from the shared device 140 through the interrupt delivery destination control module 300 of the interrupt emulator 171 and continue to use the shared device 140. Accordingly, without waiting until the guest OS1 (181-1) or the CPU1 (110-1) in which a fault has occurred recovers from the fault, the use of the shared device 140 can be continued on the guest OS2 (181-2).

Figure 2:
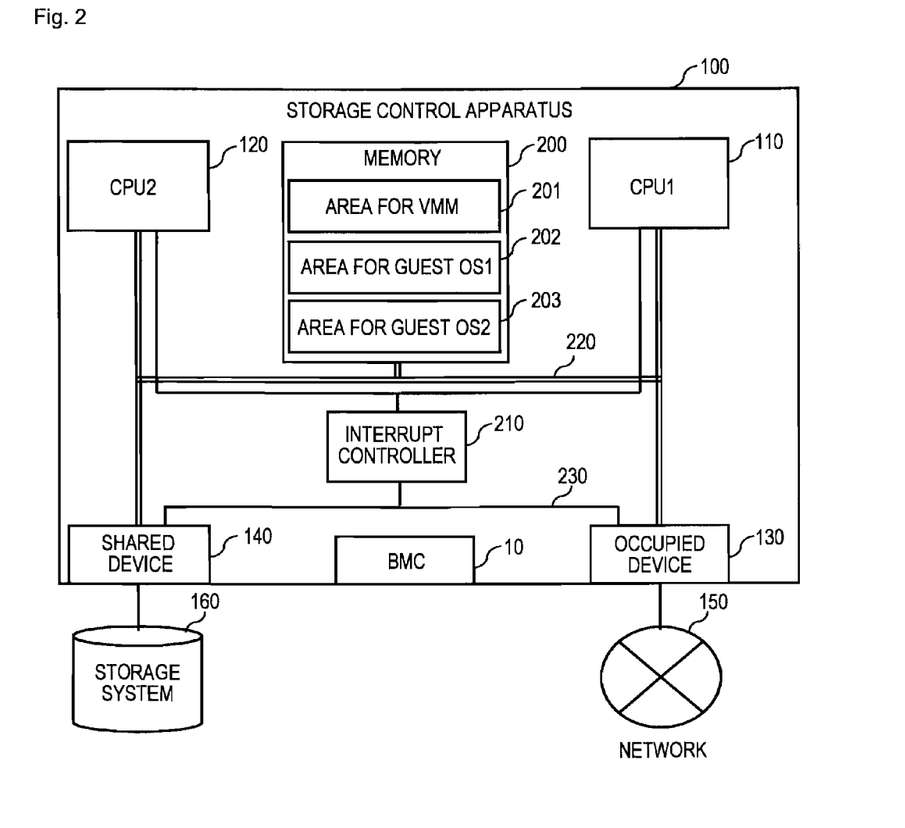
FIG. 2 shows the first embodiment of this invention, and is a block diagram of hardware of a storage control apparatus.

FIG. 2 is a block diagram illustrating an example of the hardware of the storage control apparatus 100. The storage control apparatus 100 includes the CPU1 (110-1) and the CPU2 (110-2) that are provided with the above-mentioned VT-x feature, a memory 200, the interrupt controller 210, the occupied device 130, and the shared device 140.

The CPU1 (110-1) and the CPU2 (110-2) are coupled to the memory 200, the occupied device 130, and the shared device 140 through a data bus 220.

Further, the CPU1 (110-1), the CPU2 (110-2), the interrupt controller 210, the occupied device 130, and the shared device 140 are coupled to one another by an interrupt signal line 230. The CPU1 (110-1) and the CPU2 (110-2) may be different processing cores on an identical chip such as a multi-core processor. The memory 200 is a main memory constructed of, for example, a DRAM. It should be noted that the memory 200 may be constructed of a nonvolatile memory such as an SRAM.

The interrupt controller 210 controls the delivery destination of the hardware I/O interrupt. The interrupt controller 210 is constructed of, for example, an I/O advanced programmable interrupt controller (I/O APIC).

The memory 200 stores an area 201 for the VMM 170, an area 202 for the guest OS1 (181-1), and an area 203 for the guest OS2 (181-2). Those areas may be read from the storage device 160 at the startup of the storage control apparatus 100 or acquired from a remote computer via the network 150.

Stored in the area 201 for the VMM 170 are a program code of the VMM 170 and data therefor. The processing of the VMM 170 is realized by executing a program code within the area 201 for the VMM 170 on the CPU1 (110-1) or the CPU2 (110-2). Stored in the area 202 for the guest OS1 (181-1) are a program code of the guest OS1 (181-1) and data therefor. The processing of the guest OS1 (181-1) is realized by executing a program code within the area 202 for the guest OS1 (181-1) on the CPU1 (110-1) as the VM1 (180-1).

In the same manner, the processing of the guest OS2 (181-2) is realized by executing a program code within the area 203 for the guest OS2 (181-2) on the CPU1 (110-1) as the VM2 (180-2).

By changing the settings of the interrupt controller 210, the interrupt delivery destination control module 300 can set the delivery destinations of the hardware I/O interrupts generated by the occupied device 130 and the shared device 140 to one of the CPU1 (110-1) and the CPU2 (110-2) or both thereof.

It should be noted that the CPU1 (110-1) and the CPU2 (110-2) include a local APIC (not shown) and can perform communications between the CPUs.

Further, the storage control apparatus 100 is provided with a baseboard management controller (BMC) 10 that monitors the hardware such as the CPU1 (110-1) and the CPU2 (110-2) and performs power management therefor. The BMC 10 is coupled to a management network (not shown).

Further, the storage control apparatus 100 may include an input device (not shown) and an output device (not shown). For example, the input device can be constructed of a keyboard and a mouse, and the output device can be constructed of a display or the like.

Figure 3:
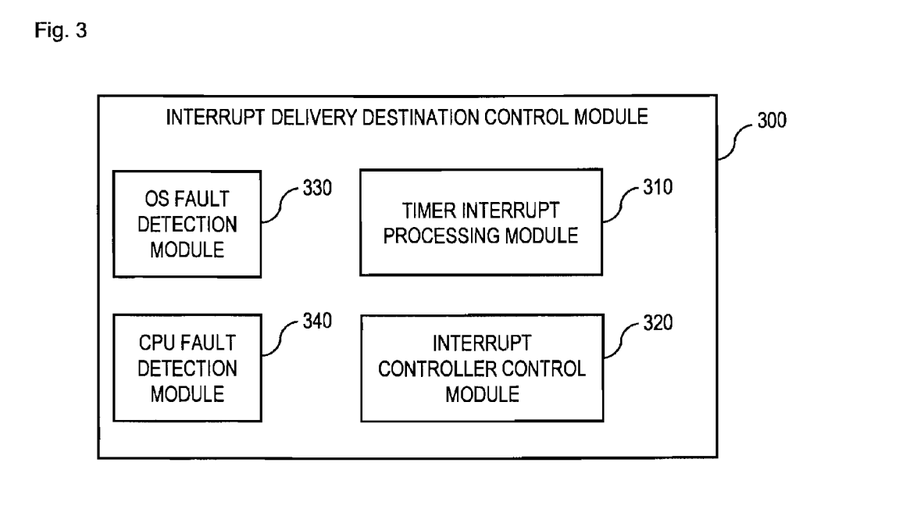
FIG. 3 shows the first embodiment of this invention, and is a block diagram showing an interrupt delivery destination control module.

FIG. 3 is a block diagram illustrating details of the interrupt delivery destination control module 300. The interrupt delivery destination control module 300 includes a timer interrupt processing module 310, an interrupt controller control module 320, an OS fault detection module 330, and a CPU fault detection module 340.

The timer interrupt processing module 310 is a module that executes a timer interrupt processing, and is, for example, an interrupt handler executed according to the interrupt of a timer of the local APIC provided to the CPU1 (110-1) and the CPU2 (110-2). The interrupt controller control module 320 is a device driver that controls the interrupt controller 210.

The OS fault detection module 330 is a module that detects a software fault that occurs in the guest OS1 (181-1) executed within the VM1 (180-1). For example, each time the OS fault detection module 330 is executed by the timer interrupt, the OS fault detection module 330 acquires by polling a value stored at a specific address in the area 202 for the guest OS1 (181-1) within the memory 200 in which a state of the guest OS1 (181-1) within the VM1 (180-1) is saved. Then, the OS fault detection module 330 compares this value with a predetermined value to thereby detect whether or not a software fault has occurred in the guest OS1 (181-1).

Alternatively, each time the guest OS level hypervisor 182 is executed, the value stored at the specific address corresponding to the guest OS1 (181-1) in the area 201 for the VMM 170 within the memory 200 may be incremented as a heartbeat, and each time the OS fault detection module 330 is executed by the timer interrupt, the OS fault detection module 330 may detecting a software fault in the guest OS1 (181-1) by judging the value of the specific address. It should be noted that it can be determined that a fault has occurred in the guest OS1 (181-1) if the value is judged as being the same as the previous one.

The CPU fault detection module 340 is a module that detects a hardware fault of the CPU1 (110-1) that executes the VM1 (180-1). The CPU fault detection module 340 is executed by the CPU2 (110-2) by the timer interrupt, and can detect that a hardware fault has occurred in the CPU1 (110-1) by judging a specific register value of the BMC 10.

Further, for example, each time the timer interrupt processing module 310 is started by the timer interrupt, a value of a counter corresponding to the CPU that has generated the timer interrupt is first incremented. Then, the CPU fault detection module 340 may judge the value of the counter and detect a hardware fault in the CPU1 (110-1) if there is no change in the value of the counter.

Figure 4:
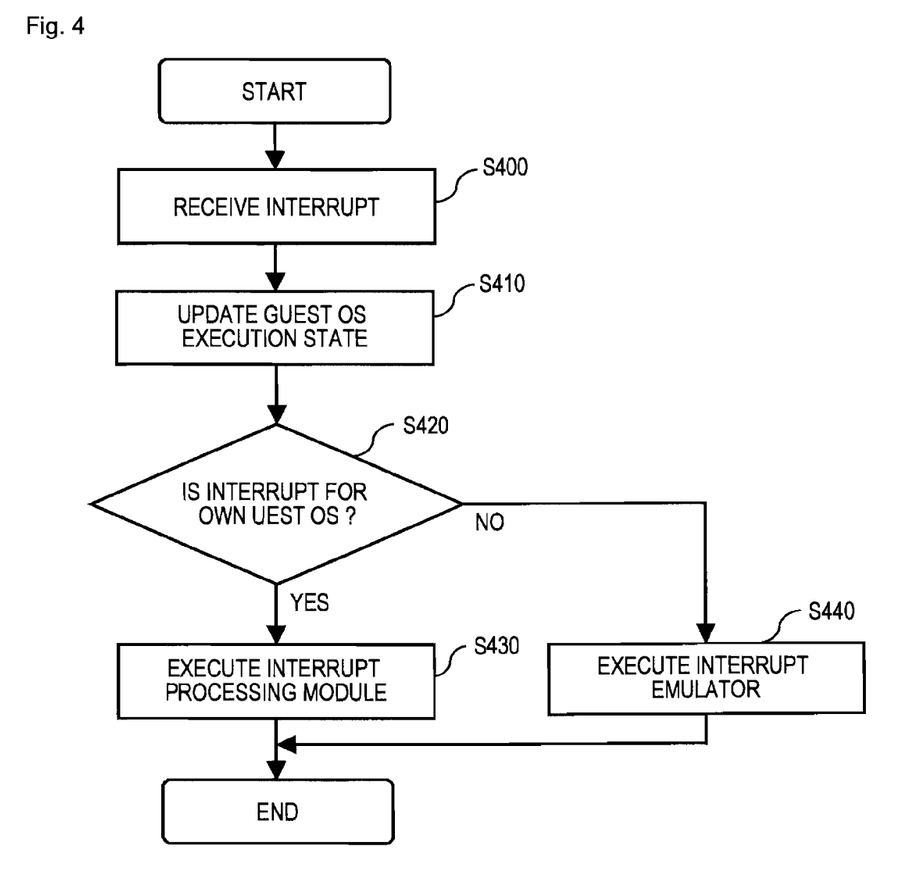
FIG. 4 shows the first embodiment of this invention, and is a flowchart of a processing performed on a guest OS level hypervisor.

FIG. 4 is a flowchart illustrating an example of a processing performed on the guest OS level hypervisor 182. This processing is executed when the guest OS1 (181-1) receives the hardware I/O interrupt.

The guest OS level hypervisor 182 receives the hardware I/O interrupt by the interrupt dispatcher 184 (S400). The guest OS level hypervisor 182 increments the value stored at the specific address corresponding to the guest OS1 (181-1) in the area 201 for the VMM 170 within the memory 200 as the heartbeat indicating the execution state of the guest OS1 (181-1) (S410).

The interrupt dispatcher 184 determines whether or not the received hardware I/O interrupt is to be processed by the guest OS1 (181-1) according to the device of the interrupt generation source or the kind of interrupt (S420).

Examples of the interrupt processed by the guest OS1 (181-1) include the hardware I/O interrupt generated by the occupied device 130 occupied by the guest OS1 (181-1) and the interrupt corresponding to the I/O request issued by the guest OS1 (181-1) among the interrupts generated by the shared device 140 shared by the guest OS1 (181-1) and the guest OS2 (181-2).

One of the interrupt that is not processed by the guest OS1 (181-1) include the interrupt corresponding to the I/O request issued by the guest OS2 (181-2) among the interrupts generated by the shared device 140.

If the interrupt is to be processed by the guest OS1 (181-1) (YES in S420), the interrupt dispatcher 184 processes the hardware I/O interrupt received by the interrupt processing module 183 (S430).

On the other hand, if the received hardware I/O interrupt is not to be processed by the guest OS1 (181-1) (NO in S420), the interrupt dispatcher 184 transfers the control to the interrupt emulator 171 by using a hypercall of the VMM 170 (S440). At this time, the execution mode of the CPU1 (110-1) is switched from the guest OS mode (VMX non-root) to a hypervisor mode (VMX root).

Figure 5:
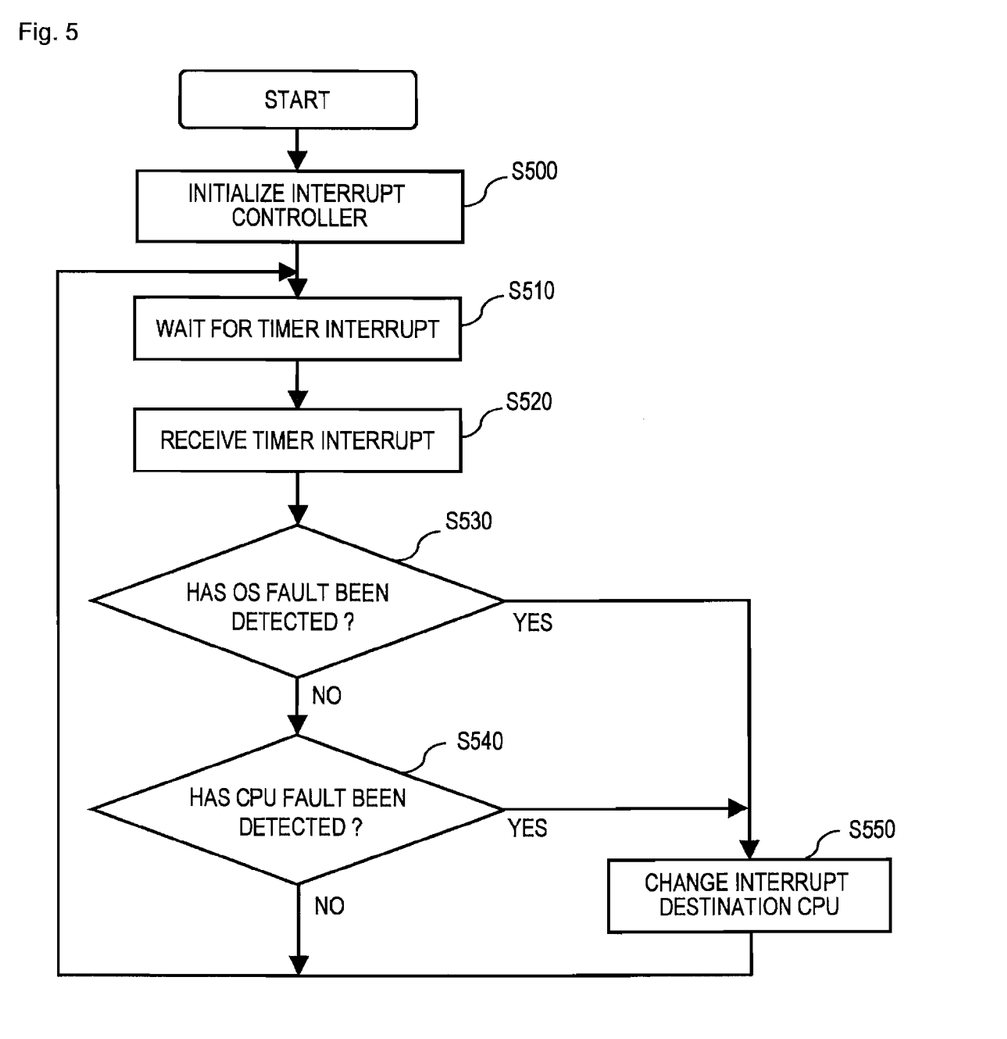
FIG. 5 shows the first embodiment of this invention, and is a flowchart of a processing performed on the interrupt delivery destination control module.

FIG. 5 is a flowchart illustrating an example of a processing performed by the interrupt delivery destination control module 300.

The interrupt delivery destination control module 300 controls the interrupt controller control module 320 to initialize the interrupt controller 210, sets the hardware I/O interrupt so as to be delivered to the CPU1 (110-1), and sets the timer interrupt so as to be received by the timer interrupt processing module 310 (S500).

The interrupt delivery destination control module 300 waits until the timer interrupt is generated (S510). At this time, the control is transferred the VM1 (180-1), and the guest OS1 (181-1) is executed on the CPU1 (110-1).

When the timer interrupt processing module 310 receives the timer interrupt, the control is transferred from the guest OS1 (181-1) to the interrupt delivery destination control module 300, and the interrupt delivery destination control module 300 restarts the processing (S520). Here, the interrupt delivery destination control module 300 increments the value of the counter corresponding to the CPU that is managed by the VMM 170 and has generated the timer interrupt.

The interrupt delivery destination control module 300 transfers the control to the OS fault detection module 330, and detects an occurrence of a fault in the guest OS1 (181-1) (S530). Here, for example, each time the OS fault detection module 330 is executed by the timer interrupt, the OS fault detection module 330 polls the value stored at the specific address in the area 202 for the guest OS1 (181-1) within the memory 200 in which the state of the guest OS1 (181-1) within the VM1 (180-1) is saved, and by analyzing the execution state of the guest OS1 (181-1), detects a fault in the guest OS1 (181-1).

If the occurrence of an OS fault is detected in the guest OS1 (181-1) (YES in S530), the interrupt delivery destination control module 300 changes an interrupt destination CPU to the CPU2 (110-2) that executes the guest OS2 (181-2) within the VM2 (180-2) (S550). The interrupt delivery destination control module 300 notifies the interrupt controller control module 320 of the change of the interrupt destination, and sets the delivery destination of the hardware I/O interrupt of the interrupt controller 210 to the CPU2 (110-2).

On the other hand, if the interrupt delivery destination control module 300 does not detect the occurrence of an OS fault (NO in S530), the interrupt delivery destination control module 300 transfers the control to the CPU fault detection module 340, and detects the occurrence of a CPU fault (S540).

Here, the CPU fault detection module 340 detects the occurrence of the hardware fault in the CPU1 (110-1) by reading the specific register value of the BMC 10 at the time of the timer interrupt by the CPU2 (110-2) and comparing the specific register value with a predetermined value. Further, for example, each time the timer interrupt processing module 310 is started by the timer interrupt, the CPU fault detection module 340 may judge the value of the counter to be updated to thereby detect the hardware fault in the CPU1 (110-1).

If the CPU fault detection module 340 detects the occurrence of the CPU fault (YES in S540), the interrupt delivery destination control module 300 changes the interrupt destination CPU of the hardware I/O interrupt to the CPU2 (110-2) that executes the guest OS2 (181-2) within the VM2 (180-2) (S550). In the same manner as described above, in Step S550, the interrupt delivery destination control module 300 notifies the interrupt controller control module 320 of the change of the interrupt destination, and sets the delivery destination of the hardware I/O interrupt to the CPU2 (110-2).

On the other hand, if the occurrence of the CPU fault is not detected (NO in S540), the interrupt delivery destination control module 300 returns to the step of waiting for the subsequent timer interrupt (S510).

By repeating the above-mentioned processing for each timer interrupt, when a fault occurs in the guest OS1 (181-1) or in the CPU1 (110-1) that executes the VM1 (180-1), the interrupt delivery destination control module 300 instructs the interrupt controller control module 320 to set the settings of the interrupt controller 210 to the CPU2 (110-2). This enables the service of the other VM2 (180-2) to continue even if a fault occurs in the VM1 (180-1) or CPU1 (110-1) that shares the I/O device therewith. In addition, the delivery destination of the hardware I/O interrupt is automatically changed by the interrupt delivery destination control module 300, which can reduce the labor of an administrator or the like. It should be noted that if the delivery destination of the hardware I/O interrupt is changed, the interrupt delivery destination control module 300 can output to the output device or the like a notification indicating that the interruption destination has been changed.

Further, in the above-mentioned embodiment, the example of executing the guest OS1 (181-1) on the VM1 (180-1) is described, but virtualized software such as a VMM or a hypervisor may be executed as a first guest on the VM1 (180-1) to provide a plurality of virtual machines within the VM1 (180-1). In other words, a VMM can be further implemented as the guest on the VMM 170 instead of the guest OS.

Further, in the above-mentioned embodiment, the example of providing the guest OS1 (181-1) with the guest OS level hypervisor 182 that provides the interrupt dispatcher 184 is described, but an interrupt dispatcher may be included in the guest OS1 (181-1).

Second Embodiment

Figure 6:
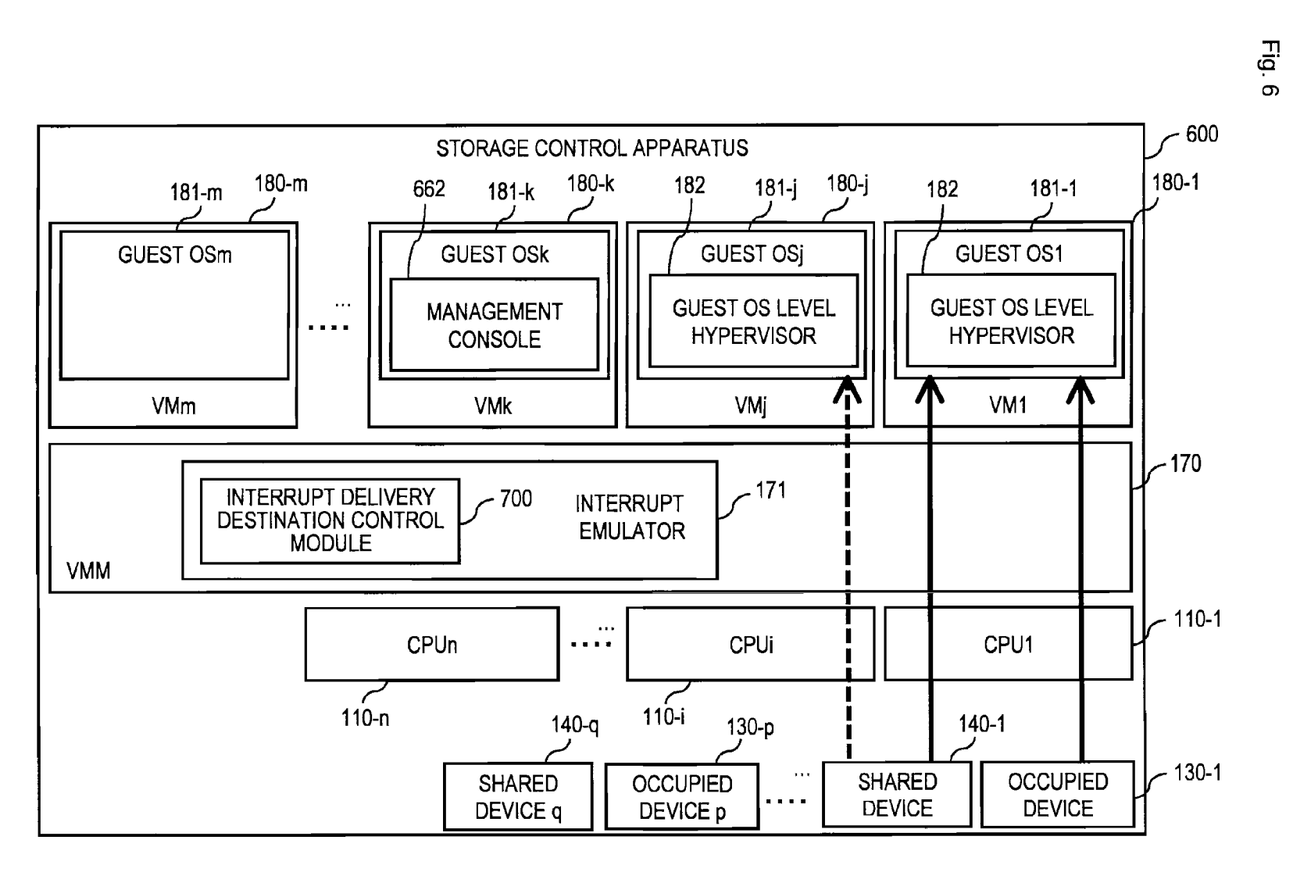
FIG. 6 shows a second embodiment of this invention, and is a block diagram of functional components of the storage control apparatus.

FIG. 6 is a block diagram of functional components of a storage control device according to a second embodiment of this invention. It should be noted that a hardware configuration thereof is the same as that of the first embodiment illustrated in the block diagram of FIG. 2 except that a large number of CPUs, a large number of occupied devices 130, and a large number of shared devices 140 are provided.

A storage control apparatus 600 includes n CPUs 110-1 to 110-n, p occupied devices 130-1 to 130-p, and q shared devices 140-1 to 140-q, and executes the guest OS1 (181-1) to a guest OSm (180-m) on m virtual machines (VMs) 180-1 to 180-m. Here, each of the number m of VMs, the number p of occupied devices 130, and the number q of shared devices 140 may be equal to or smaller than the number n of CPUs or may exceed the number n of CPUs. If the number m of VMs exceeds the number n of CPUs, for example, a virtual machine k (VMk) 180-k to a virtual machine m (VMm) 180-m that store a guest OSk (181-k) to a guest OSm (180-m) being general-purpose OSs, respectively, may be executed on a CPU n (110-n) in a time-division manner Further, an occupied device p (130-p) may be an I/O device physically identical with the occupied device 130-1, and may be a plurality of virtual I/O devices by virtualizing the occupied device 130-1 by using, for example, a virtualization technology such as SR-IOV. In the same manner, a shared device q (140-q) may be a device physically different from the shared device 140-1, or may be a plurality of virtual I/O devices by virtualizing the shared device 140-1.

A guest OSj (181-j) within the VMj (180-j) is a dedicated real-time OS including the guest OS level hypervisor 182 in the same manner as the guest OS1 (181-1), and is mainly executed on a CPUi (110-i). The guest OSj (181-j) provides, for example, a block storage service by the iSCSI or FCoE protocol.

The VMj (180-j) may provide a service in parallel with the VM1 (180-1), or may have the execution restarted at the occurrence of a fault in the guest OS1 (181-1) or the CPU1 (110-1) after being temporarily stopped while a snapshot of the VM1 (180-1) is acquired as a backup image of the VM1 (180-1).

The guest OSk (181-k) within the VMk (180-k) is a general-purpose OS, and includes a management console 662. The management console 662 is a screen that is operated by the administrator or the like in managing the storage control apparatus 600, and may be a GUI using a web browser or a CLI such as a command prompt.

A guest OSm (181-m) within the VMm (180-m) is a general-purpose OS similar to the guest OS2 (181-2) according to the first embodiment, and provides a file storage service using, for example, the NFS or CIFS protocol.

It should be noted that in the following description, the CPU1 (110-1) to the CPUn (110-n) are generically referred to as a CPU 110 by omitting a suffix, and the other components are also generically referred to by eliminating the suffix.

An interrupt delivery destination control module 700 of this embodiment is different from the interrupt delivery destination control module 300 of the first embodiment in that the interrupt destination is switched according to a policy set by the administrator via the management console 662.

Further, when a fault is detected in the VM 180, the CPU 110, or the I/O device (occupied device 130 or shared device 140), the interrupt delivery destination control module 700 may notify the administrator of contents of the fault via the management console 662 and present an interrupt destination change plan corresponding to the set policy.

For example, if a fault is detected in the guest OS1 (181-1), the interrupt delivery destination control module 700 switches the delivery destination of the hardware I/O interrupt of the shared device 140-1 to the CPUi (110-i) that executes the VMj (180-j), instructs the interrupt controller control module 320 so that the hardware I/O interrupt of the shared device 140-1 is delivered to the guest OS level hypervisor 182 of the guest OSj (181-j), and changes the settings of the interrupt controller 210.

The interrupt delivery destination control module 700 monitors the fault in the I/O device, and if a fault is detected in, for example, the occupied device 130-1, allocates the occupied device p (130-p) to the VM1 (180-1) as an alternative device, instructs the interrupt controller control module 320 so that the hardware I/O interrupt from the occupied device p (130-p) is delivered to the CPU1 (110-1), and changes the settings of the interrupt controller 210.

In the same manner, if a fault is detected in, for example, the shared device 140-1, the interrupt delivery destination control module 700 allocates the shared device q (140-q) to the VM1 (180-1) as an alternative device, instructs the interrupt controller control module 320 so that the hardware I/O interrupt from the shared device q (140-q) is delivered to the CPU1 (110-1), and changes the settings of the interrupt controller 210.

It should be noted that in an environment in which a large number of CPUs such as many cores execute a large number of VMs, if a change is made to the configuration of the virtual machine or the I/O device, the interrupt delivery destination control module 700 can change the delivery destination of the hardware I/O interrupt. This can reduce the time and labor of the administrator in manually studying an interrupt configuration and changing the settings of the interrupt controller 210 as in the above-mentioned conventional example.

Further, the storage control apparatus 600 may include an input device (not shown) and an output device (not shown). For example, the input device can be constructed of a keyboard and a mouse, and the output device can be constructed of a display or the like.

Figure 7:
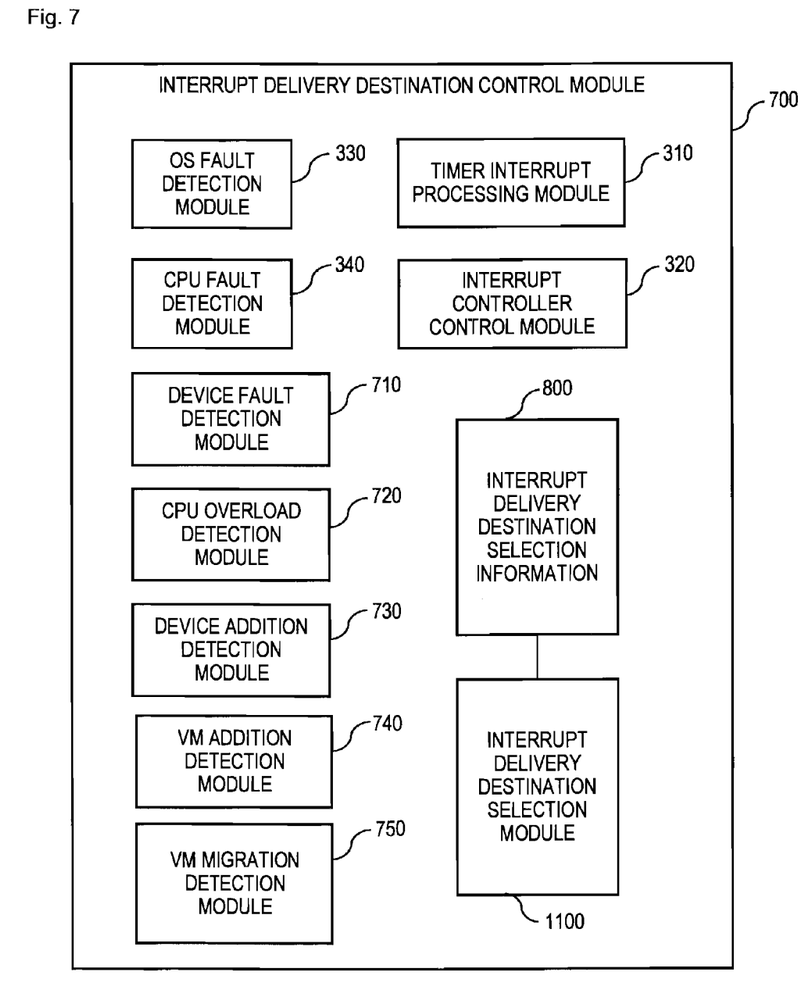
FIG. 7 shows the second embodiment of this invention, and is a block diagram of the interrupt delivery destination control module.

FIG. 7 illustrates details of the interrupt delivery destination control module 700 according to the second embodiment. In the same manner as in the first embodiment illustrated in FIG. 3, the interrupt delivery destination control module 700 includes not only the timer interrupt processing module 310, the interrupt controller control module 320, the OS fault detection module 330, and the CPU fault detection module 340 but also a device fault detection module 710, a CPU overload detection module 720, a device addition detection module 730, a VM addition detection module 740, a VM migration detection module 750, an interrupt delivery destination selection information 800, and an interrupt delivery destination selection module 1100. It should be noted that the description of the same components as those of the first embodiment illustrated in FIG. 3 is omitted.

The device fault detection module 710 detects a fault in the I/O device such as the occupied device 130 or the shared device 140. In the detection of a fault that occurs in the I/O device, for example, fault information provided by the device may be acquired, or an operation status of the device may be periodically monitored and judged.

The CPU overload detection module 720 detects overload of the CPU 110 or the like. For the detection of overload of the CPU 110, for example, load information acquired by a guest OS 181 on the CPU 110 is acquired via an interface provided by the guest OS 181. Then, the CPU overload detection module 720 can determine the overload if the acquired load exceeds a threshold value. An allowable CPU load 904 of FIG. 9 can be used as the threshold value. Alternatively, the CPU overload detection module 720 may measure the number of instructions executed on the CPU 110 by using a model specific register (MSR) and judge the overload by comparing a value of the measurement with a predetermined value. It should be noted that the VMM 170 is assumed to have a table (not shown) for managing a correspondence relationship between an identifier of the CPU 110 that is presently being monitored by the interrupt delivery destination control module 700 and an OS identifier 901 within a guest OS information management table 900.

The device addition detection module 730 detects addition (or deletion) of a new I/O device (occupied device 130 or shared device 140) to the storage control apparatus 600. The detection of the addition of the I/O device can be realized by, for example, monitoring an interrupt generated by a device hotplug. Alternatively, the device addition detection module 730 may detect the addition or deletion of the I/O device by conducting periodic polling across a PCI space.

The VM addition detection module 740 detects addition of a new virtual machine to the storage control apparatus 600. For the detection of the VM, for example, an instruction to add the virtual machine issued by the administrator via the management console 662 may be detected.

The VM migration detection module 750 detects migration of a virtual machine 180 within the storage control apparatus 600. For the detection of the migration of the virtual machine 180, for example, a migration processing of the virtual machine performed by the VMM 170 may be detected, or a migration operation of the virtual machine performed by the administrator via the management console 662 may be detected.

The interrupt delivery destination selection information 800 is used as information based on which the interrupt delivery destination control module 700 selects the CPU of the delivery destination of the hardware I/O interrupt when a predetermined state is detected by any one of the OS fault detection module 330, the CPU fault detection module 340, the device fault detection module 710, the CPU overload detection module 720, the device addition detection module 730, the VM addition detection module 740, and the VM migration detection module 750.

The interrupt delivery destination selection module 1100 changes the CPU1 (110-1) of an interrupt delivery destination of each device to CPUj (110-j) via the interrupt controller control module 320 based on the interrupt delivery destination selection information 800. It should be noted that the interrupt delivery destination control module 700 also performs the same processing on the CPU 110 other than the CPU1 (110-1).

Figure 12:
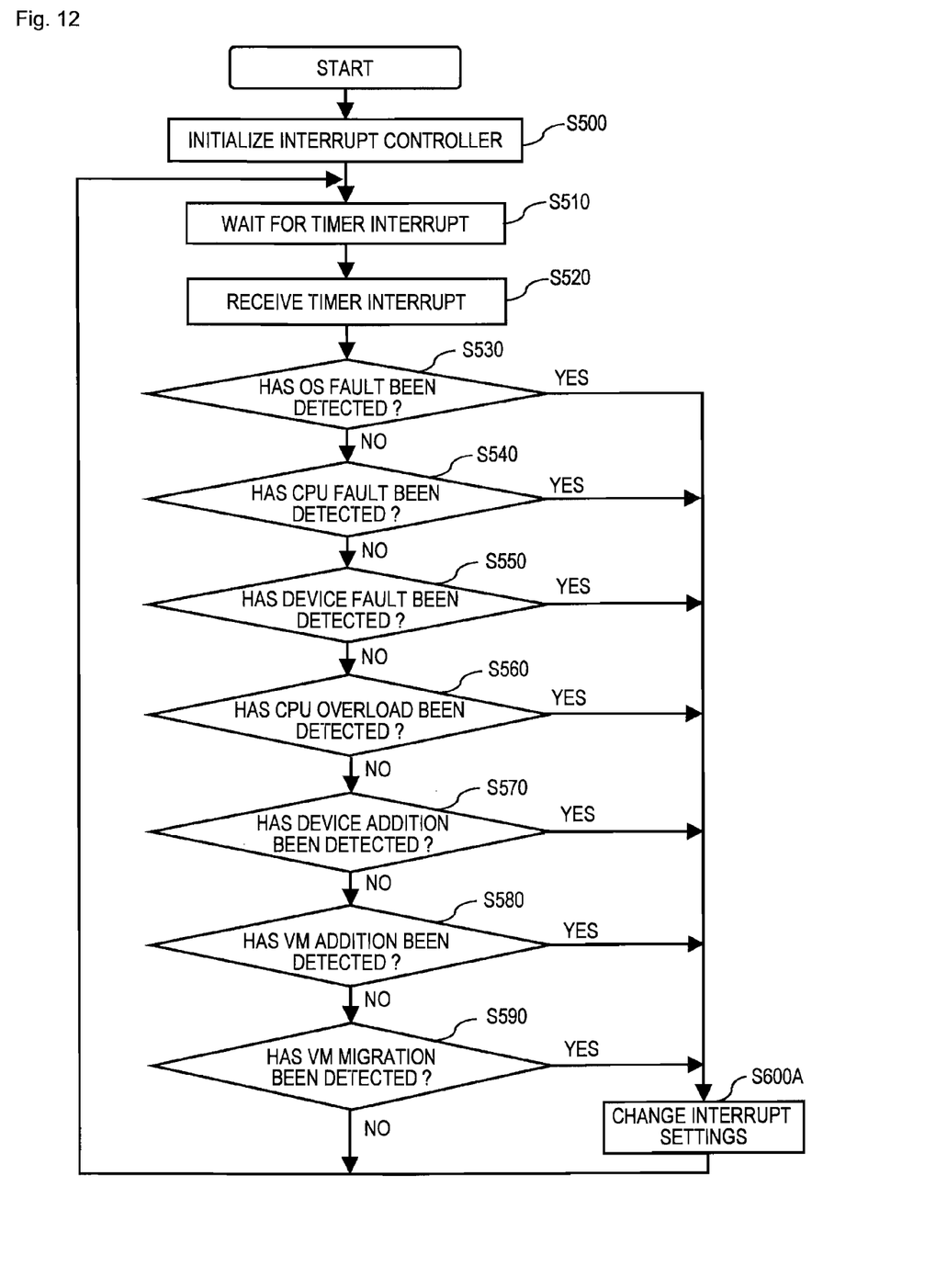
FIG. 12 shows the second embodiment of this invention, and is a flowchart of a processing performed on the interrupt delivery destination control module.

FIG. 12 is a flowchart of a processing performed by the interrupt delivery destination control module 700. In the following example, the processing is performed on the CPU1 (110-1).

In Steps S500 to S540, in the same manner as in the first embodiment illustrated in FIG. 5, the interrupt delivery destination control module 700 initializes the interrupt controller 210, sets an interrupt timer, receives the timer interrupt, detects the fault in the guest OS 181 by the OS fault detection module 330, and detects the fault in the CPU 110 by the CPU fault detection module 340.

In the second embodiment, the occurrence of a fault and a change of the configuration are detected in Step S550 and the subsequent steps. In Step S550, the device fault detection module 710 detects the fault in the I/O device, and if the fault occurs in the I/O device, the procedure advances to Step S600A.

Subsequently, in Step S560, the CPU overload detection module 720 detects the overload of the CPU 110. The CPU overload detection module 720 acquires the allowable CPU load 904 within the guest OS information management table 900 from the identifier of the OS allocated to the CPU 110, and if the load on the CPU 110 exceeds the allowable CPU load 904, determines that overload occurs on the CPU 110, and the procedure advances to a processing of Step S600A. It should be noted that the VMM 170 may retain a table (not shown) that indicates a correspondence relationship between the identifier of the CPU 110 and the OS identifier 901.

Subsequently, in Step S570, the device addition detection module 730 detects the addition of the I/O device. If the addition of the I/O device is detected, the procedure advances to the processing of Step S600A.

Subsequently, in Step S580, the VM addition detection module 740 detects the addition of the virtual machine 180. If the addition of the virtual machine 180 is detected, the procedure advances to the processing of Step S600A.

Subsequently, in Step S590, the VM migration detection module 750 detects the migration of the virtual machine 180. For example, when the guest OS1 (181-1) allocated to the CPU1 (110-1) is migrated to VMj (180-j), the migration of the virtual machine 180 is detected, and the procedure advances to the processing of Step S600A.

In Step S600A, the delivery destination of the hardware I/O interrupt is updated or configuration information is received according to the detected fault or the cause of the change. For example, if the device addition detection module 730 detects the addition of the I/O device, the interrupt delivery destination control module 700 instructs the management console 662 to add information on the added I/O device to a device information management table 1000 described later. Further, if the VM addition detection module 740 detects the addition of the virtual machine 180, the interrupt delivery destination control module 700 instructs the management console 662 to add information on the added guest OS to the guest OS information management table 900 described later.

Figure 8:
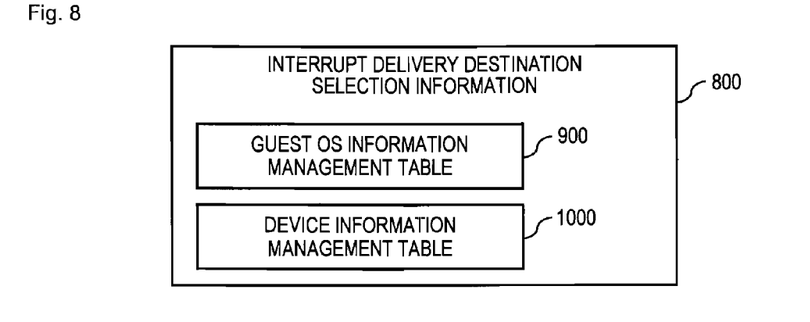
FIG. 8 shows the second embodiment of this invention, and is details of the interrupt delivery destination selection information.

FIG. 8 illustrates details of the interrupt delivery destination selection information 800.

The interrupt delivery destination selection information 800 includes the guest OS information management table 900 that stores information on the guest OS such as the guest OS 181 and the device information management table 1000 that stores the information on the I/O device such as the occupied device 130.

Figure 9:
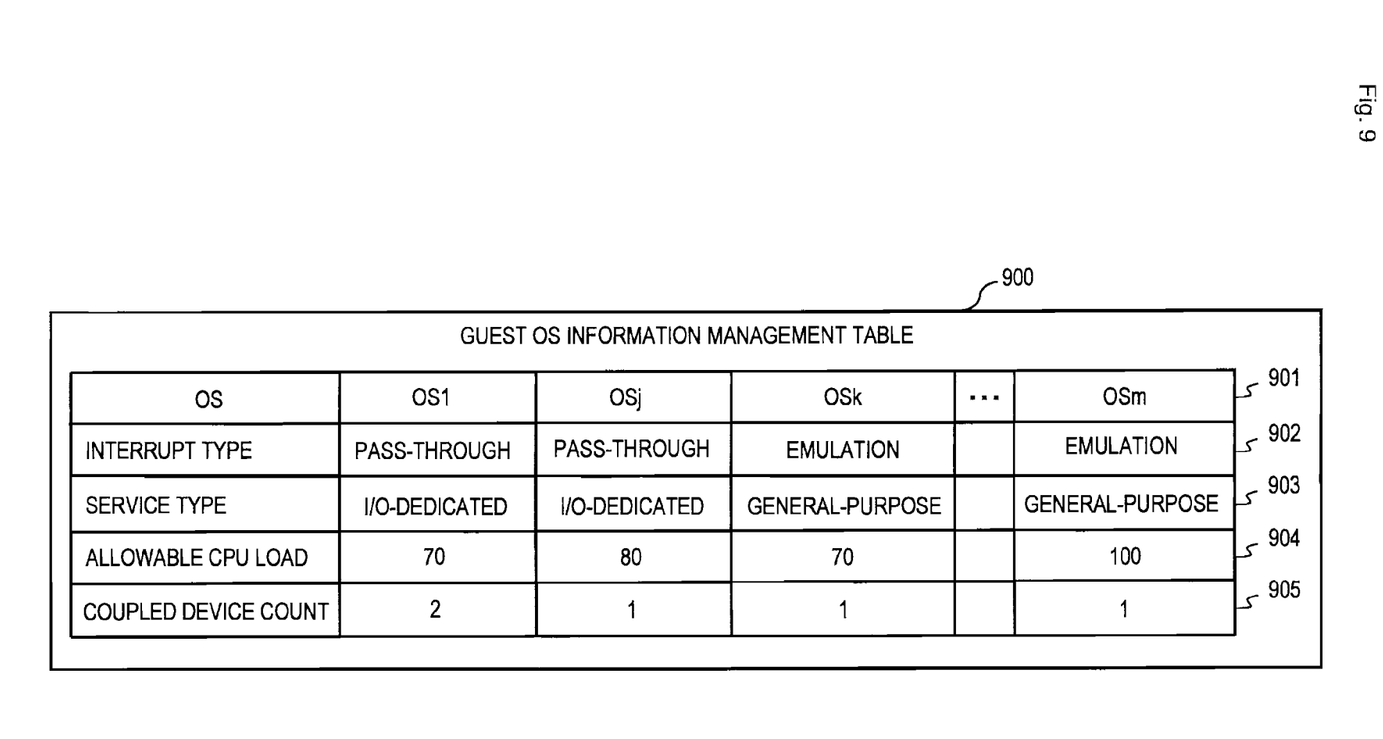
FIG. 9 shows the second embodiment of this invention, and is details of the guest OS information management table.

FIG. 9 illustrates details of the guest OS information management table 900. The guest OS information management table 900 stores information on each guest OS running on the VMM 170 of the storage control apparatus 600 and operation policies thereof. The information on each guest OS can be set by the administrator or the like by using the management console 662 and the input device (not shown). Further, a field for associating the identifier of the guest OS with the identifier of the CPU 110 may be provided.

The guest OS information management table 900 has each entry structured by the OS identifier 901, an interrupt type 902, a service type 903 provided by the guest OS, the allowable CPU load 904 that stores a threshold value based on which the overload of the CPU 110 is judged, and a coupled device count 905 that stores the number of I/O devices coupled to the guest OS.

In the interrupt type 902, any one of "pass-through" and "emulation" of the hardware I/O interrupt is set. For example, the guest OS1 (181-1) receives the hardware I/O interrupt by pass-through, and includes the guest OS level hypervisor 182.

The service type 903 indicates a service provided to another computer by the guest OS via the network 150, and stores any one of "I/O-dedicated" and "general-purpose". For example, the guest OS1 (181-1) is "I/O-dedicated", and provides a storage service or the like specialized in I/O.

The allowable CPU load 904 is a CPU load factor allowed by the guest OS. For example, the guest OS1 (181-1) allows the operation with a load factor of 70 percent or less for the purpose of stable running. The CPU overload detection module 720 judges the overload of the guest OS 181 executed on each CPU 110 based on such a threshold value.

The coupled device count 905 is the number of devices on the storage control apparatus 600 coupled to the guest OS, and for example, two devices of the occupied device 130 and the shared device 140 are coupled to the guest OS1 (181-1).

Those values are set by the administrator via the management console 662 when the guest OS is introduced. Alternatively, information on a replication source may be taken over when the guest OS, in other words, a VM is replicated, and may be set automatically by the VMM 170 or manually by the administrator via the management console 662.

Figure 10:
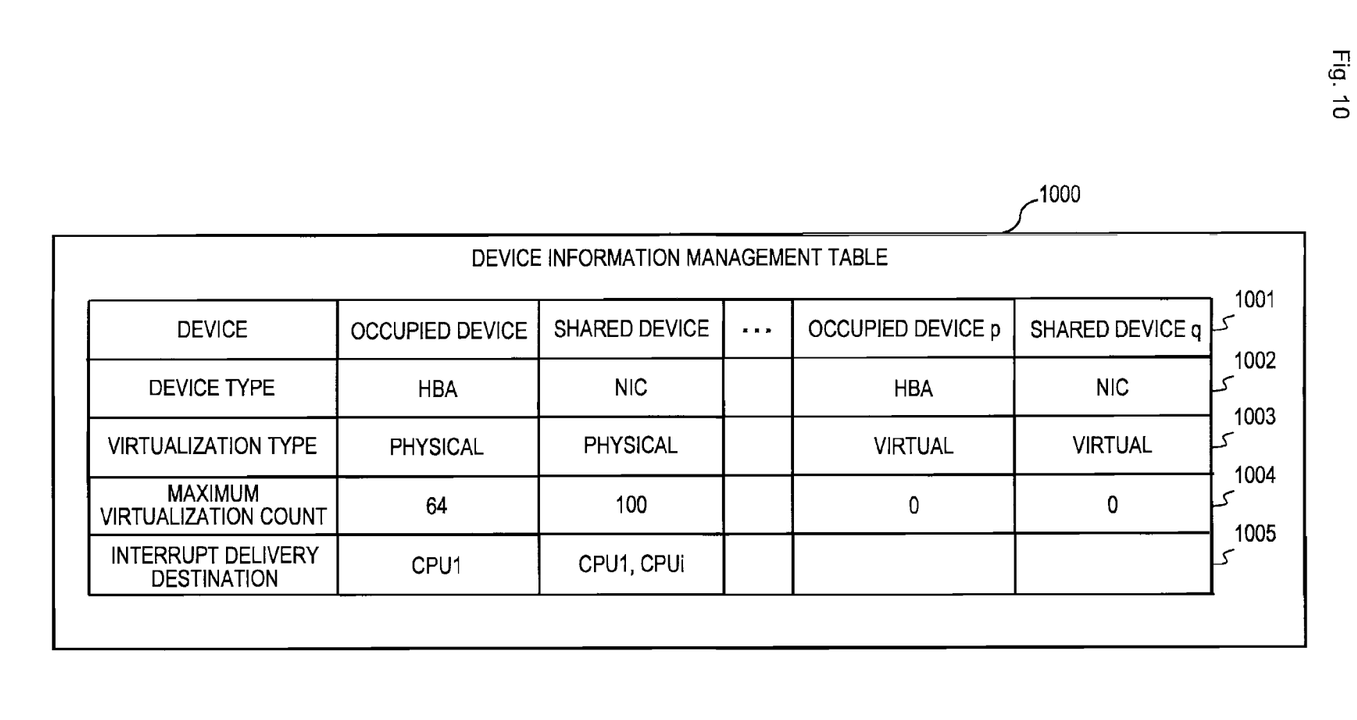
FIG. 10 shows the second embodiment of this invention, and is details of the device information management table.

FIG. 10 illustrates details of the device information management table 1000. The device information management table 1000 stores the information on the I/O device coupled to the storage control apparatus 600. The device information management table 1000 has each entry structured by a device 1001 that stores a name or identifier of the I/O device, a device type 1002 that stores the type of I/O device, a virtualization type 1003 that stores the type of virtualization, a maximum virtualization count 1004 that stores the number of virtual devices that can be provided, and an interrupt delivery destination 1005 that stores the identifier of the CPU 110 of the set delivery destination of the hardware I/O interrupt.

The device type 1002 is the type of I/O device such as an HBA or a NIC, and the occupied device 130 is, for example, an HBA.

The virtualization type 1003 indicates which of a physical device or a virtualized physical device the I/O device is, and the shared device q (140-q) is, for example, a virtual device.

The maximum virtualization count 1004 is the maximum number of I/O devices that can be virtualized and used as a plurality of virtual devices, and the maximum virtualization count of occupied devices 130 is, for example, 64. As a similar concept, the maximum virtualization count 1004 may be a value such as a maximum VLAN tag count corresponding to a NIC device.

The interrupt delivery destination 1005 is a CPU to which the I/O device delivers the hardware I/O interrupt, and the interrupt delivery destination of the shared device 140 is, for example, the CPU1 (110-1) and the CPUi (110-i).

Those values may be set by the administrator via the management console 662 and the input device (not shown) when the I/O device is introduced, or may be set by acquiring information automatically by using a technology such as plug-and-play.

Figure 11:
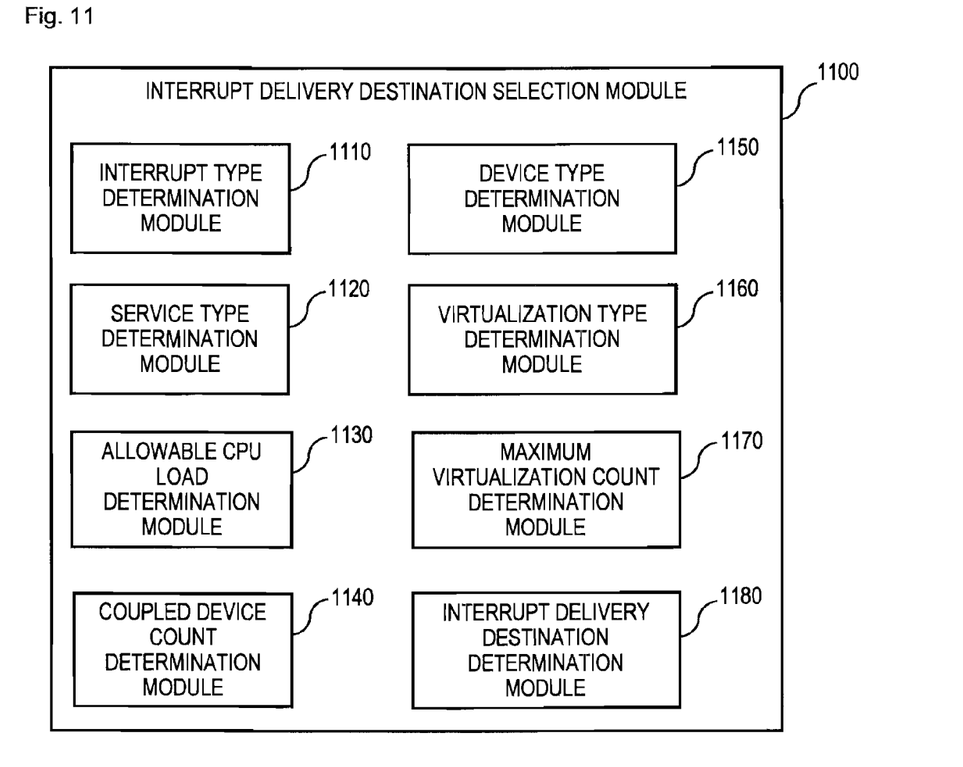
FIG. 11 shows the second embodiment of this invention, and is a block diagram showing the interrupt delivery destination selection module.

FIG. 11 is a block diagram illustrating details of the interrupt delivery destination selection module 1100.

The interrupt delivery destination selection module 1100 includes an interrupt type determination module 1110, a service type determination module 1120, an allowable CPU load determination module 1130, a coupled device count determination module 1140, a device type determination module 1150, a virtualization type determination module 1160, a maximum virtualization count determination module 1170, and an interrupt delivery destination determination module 1180. The interrupt delivery destination selection module 1100 performs the selection of the delivery destination of the hardware I/O interrupt and the I/O device or the like according to a preset policy.

If the OS fault detection module 330 or the CPU fault detection module 340 detects a guest OS fault, a CPU fault, or the like, the interrupt type determination module 1110 references the interrupt type 902 within the guest OS information management table 900 to switch the interrupt delivery destination of the device coupled to the guest OS or the CPU in which a fault has occurred to a different CPU.

If a fault occurs in, for example, the guest OS1 (181-1), the interrupt type determination module 1110 selects the guest OSj (181-j) corresponding to the same interrupt type 902 as that of the guest OS1 (181-1), in other words, "pass-through" as the interrupt destination of the shared device 140, and determines that the delivery destination is to be changed to the CPUi (110-i) that executes the guest OSj (181-j). Then, the interrupt type determination module 1110 instructs the interrupt controller control module 320 to change the delivery destination of the hardware I/O interrupt, and updates the interrupt delivery destination 1005 of the shared device 140 within the device information management table 1000 of FIG. 10.

If the OS fault detection module 330 or the CPU fault detection module 340 detects the guest OS fault, the CPU fault, or the like, the service type determination module 1120 references the service type 903 of the guest OS information management table 900 to switch the interrupt delivery destination of the hardware I/O interrupt of the I/O device to a different guest OS that provides the same surface. In other words, the service type 903 preferentially selects the guest OS of the same type as the interrupt delivery destination.

It should be noted that when the guest OS fault or the CPU fault occurs, any one of the interrupt type determination module 1110 and the service type determination module 1120 may decide the delivery destination of the hardware I/O interrupt, or AND of outputs from the interrupt type determination module 1110 and the service type determination module 1120 may be used.

If the CPU overload detection module 720 detects a CPU load of a guest OS exceeding the allowable CPU load 904 (threshold value) within the guest OS information management table 900 of FIG. 9, the allowable CPU load determination module 1130 changes the delivery destination of the hardware I/O interrupt to the CPU 110 that executes the guest OS of which the threshold value (allowable CPU load 904) is higher. Alternatively, the delivery destination of the hardware I/O interrupt may be changed to the CPU 110 of which the CPU load acquired by the CPU overload detection module 720 is lowest.

If the OS fault detection module 330 or the CPU fault detection module 340 detects the guest OS fault, the CPU fault, or the like, the coupled device count determination module 1140 references the service type 903 of the guest OS information management table 900 to select the guest OS of which the coupled device count 905 is small.

In other words, when the interrupt type determination module 1110 and the service type determination module 1120 select the guest OS, the coupled device count determination module 1140 can set the guest OS whose load is low as the delivery destination of the hardware I/O interrupt by first selecting the guest OS of which the coupled device count 905 is smaller.

When the device fault detection module 710 determines the fault in the I/O device, the device type determination module 1150 selects the device having the same device type 1002 within the device information management table 1000 of FIG. 10 as the alternative device for the I/O device. For the selected device, the coupled device count determination module 1140 updates the interrupt delivery destination 1005 within the device information management table 1000 to the delivery destination of the I/O device in which a fault has occurred.

When the above-mentioned device type determination module 1150 selects the alternative device, the virtualization type determination module 1160 preferentially selects the device of which the virtualization type 1003 within the device information management table 1000 is "physical". For example, the device type determination module 1150 may select a plurality of candidates for the alternative device, and the virtualization type determination module 1160 may select the device of which the virtualization type 1003 is "physical" from among those candidates.

When the above-mentioned device type determination module 1150 selects the alternative device, the maximum virtualization count determination module 1170 compares the values of the maximum virtualization count 1004 within the device information management table 1000 and preferentially selects the device having a small value. For example, the device type determination module 1150 may select a plurality of candidates for the alternative device, and the maximum virtualization count determination module 1170 may select the device of which the maximum virtualization count 1004 is smallest from among those candidates.

When the VM migration detection module 750 detects the migration of the virtual machine 180, the interrupt delivery destination determination module 1180 switches the delivery destination of the hardware I/O interrupt from the CPU 110 of a migration source that executes the virtual machine 180 to the CPU 110 of a migration destination. For the I/O device allocated to the virtual machine 180 of a migration target, the interrupt delivery destination determination module 1180 updates the interrupt delivery destination 1005 within the device information management table 1000 to the identifier of the CPU of the migration destination.

As described above, according to the second embodiment, when a fault occurs in the guest OS or the CPU 110, in the same manner as in the first embodiment, the hardware I/O interrupt from the I/O device can be received through the interrupt delivery destination control module 700 of the interrupt emulator 171, and the use of the I/O device can be continued. Accordingly, without waiting until the guest OS or the CPU 110 in which a fault has occurred recovers from the fault, the use of the I/O device can be continued.

In addition, in the second embodiment, according to the policy set in the interrupt delivery destination control module 700, the type of guest OS selected at the time of a fault, the type of interrupt, the type of I/O device, the load thereon, or the like can automatically be determined, and the delivery destination of the hardware I/O interrupt can automatically be set. Accordingly, the storage control apparatus 600 that uses a large number of virtual machines 180 and a large number of I/O devices can reduce the load imposed on the administrator.

Further, in the first and second embodiments, the examples in which the storage control apparatuses 100 and 600 are coupled to the storage device 160 by the HBA are described, but in the case of using FCoE or the like, the storage device 160 and the storage control apparatuses 100 and 600 may be coupled to each other via the MC.

Further, in the first and second embodiments, the examples in which a plurality of VMs (guest OSs) are provided on the VMM 170 are described, but the virtualized software such as a VMM or a hypervisor may be executed within the VM1, and a plurality of virtual machines may be provided within the VM1. In other words, a second VMM can be further implemented as a guest on the VMM 170 instead of the guest OS.

Further, in the first and second embodiments, the configuration including the interrupt delivery destination control modules 300 and 700 within the interrupt emulator 171 of the VMM 170 is described, but although not illustrated, the interrupt emulator 171 may be configured separately from the interrupt delivery destination control modules 300 and 700.

The invention claimed is:
1. A storage control apparatus, comprising:
a plurality of processors;
a memory;
an I/O device coupled to a storage device;
a virtualization module that allocates a first processor to a first guest and a second processor to a second guest from among the plurality of processors; and
an interrupt control module that receives an interrupt generated by the I/O device and transmits the interrupt to any one of the plurality of processors,
wherein the virtualization module comprises:
a state detection module that detects at least one of a state of the first guest and a state of the first processor; and
an interrupt delivery destination control module that switches the delivery destination of the interrupt generated by the I/O device for the first processor to the second processor to deliver the interrupt to the second processor when the state detection module detects at least one of the state of the first guest and the state of the first processor becomes a predetermined state.

2. The storage control apparatus according to claim 1, wherein the first guest comprises:
   an interrupt processing module that processes the interrupt; and
   an interrupt dispatcher that transfers the interrupt to the interrupt processing module if it is determined that the interrupt received from the interrupt control module is an interrupt to be processed by the first guest.

3. The storage control apparatus according to claim 1, wherein: the first guest comprises an interrupt dispatcher that transfers the interrupt to the virtualization module if it is determined that the interrupt received from the interrupt control module is an interrupt to be processed by another guest; and
   the virtualization module emulates the interrupt transferred from the interrupt dispatcher and notifies the second processor of the interrupt.

4. The storage control apparatus according to claim 1, wherein the interrupt delivery destination control module changes settings of the interrupt control module so that the interrupt with respect to the first processor is switched to the second processor.

5. The storage control apparatus according to claim 1, wherein at least one of the first guest and the second guest comprises an OS.

6. The storage control apparatus according to claim 1, wherein at least one of the first guest and the second guest comprises a second virtualization module.

7. The storage control apparatus according to claim 4, wherein:
   the virtualization module comprises:
   a guest of a first type; and
   a guest of a second type; and
   the interrupt delivery destination control module selects a guest of a type corresponding to the first guest as the second guest from the guest of the first type and the guest of the second type that are comprised by the virtualization module.

8. The storage control apparatus according to claim 7, wherein: the guest of the first type directly receives the interrupt; and the guest of the second type receives the interrupt via the virtualization module.

9. The storage control apparatus according to claim 7, wherein:
   the guest of the first type comprises a first I/O device; and
   the guest of the second type comprises a second I/O device.

10. The storage control apparatus according to claim 9, wherein
    the interrupt delivery destination control module selects a guest to which a small number of I/O devices are coupled from one of the guest of the first type and the guest of the second type that comprises an I/O device identical to the first guest.

11. The storage control apparatus according to claim 4, wherein the state detection module detects, as the predetermined state, that the first guest has been migrated to the second guest.

12. The storage control apparatus according to claim 4, wherein the state detection module detects, as the predetermined state, that load on the first processor of the first guest exceeds a predetermined threshold value.

13. The storage control apparatus according to claim 4, wherein the state detection module detects, as the predetermined state, that a fault has occurred in an I/O device of the first guest.

* * * * *